US010995219B2

(12) United States Patent
Bailey et al.

(10) Patent No.: US 10,995,219 B2
(45) Date of Patent: May 4, 2021

(54) FREE RADICAL-CURABLE COATING AND SEALANT COMPOSITIONS WITH IMPROVED SURFACE CURE PROPERTIES

(71) Applicant: Arkema France, Colombes (FR)

(72) Inventors: Michael A. Bailey, Aston, PA (US); Ronald R. Wlodyga, Phoenixville, PA (US)

(73) Assignee: Arkema France, Colombes (FR)

( * ) Notice: Subject to any disclaimer, the term of this patent is extended or adjusted under 35 U.S.C. 154(b) by 100 days.

(21) Appl. No.: 16/085,011

(22) PCT Filed: Mar. 6, 2017

(86) PCT No.: PCT/EP2017/055187
§ 371 (c)(1),
(2) Date: Sep. 14, 2018

(87) PCT Pub. No.: WO2017/157711
PCT Pub. Date: Sep. 21, 2017

(65) Prior Publication Data
US 2019/0077965 A1    Mar. 14, 2019

Related U.S. Application Data

(60) Provisional application No. 62/308,273, filed on Mar. 15, 2016.

(51) Int. Cl.
| | |
|---|---|
| *C08G 75/02* | (2016.01) |
| *C09D 4/06* | (2006.01) |
| *C09J 4/00* | (2006.01) |
| *C09D 4/00* | (2006.01) |
| *C08F 222/10* | (2006.01) |
| *C08G 75/00* | (2006.01) |
| *C09J 4/06* | (2006.01) |
| *C08F 4/28* | (2006.01) |
| *C08F 220/18* | (2006.01) |
| *C08K 5/37* | (2006.01) |
| *C09D 133/06* | (2006.01) |
| *C09D 133/14* | (2006.01) |

(52) U.S. Cl.
CPC .............. *C09D 4/06* (2013.01); *C08F 222/10* (2013.01); *C08G 75/00* (2013.01); *C08G 75/02* (2013.01); *C09D 4/00* (2013.01); *C09J 4/00* (2013.01); *C09J 4/06* (2013.01); *C08F 4/28* (2013.01); *C08F 220/18* (2013.01); *C08K 5/37* (2013.01); *C09D 133/066* (2013.01); *C09D 133/068* (2013.01); *C09D 133/14* (2013.01)

(58) Field of Classification Search
None
See application file for complete search history.

(56) References Cited

U.S. PATENT DOCUMENTS

| | | | |
|---|---|---|---|
| 4,263,372 A | 4/1981 | Emmons et al. | |
| 4,429,063 A * | 1/1984 | Reich | C09J 4/00 523/176 |
| 4,520,184 A | 5/1985 | Van Eenam | |
| 4,791,185 A * | 12/1988 | Kanemura | C08G 18/3876 528/73 |
| 5,164,127 A | 11/1992 | Boeckeler | |
| 5,387,661 A | 2/1995 | Frost | |
| 5,567,788 A | 10/1996 | Zezza | |
| 5,721,326 A | 2/1998 | Frost | |
| 6,395,882 B1 | 5/2002 | Edgington | |
| 6,551,710 B1 | 4/2003 | Chen et al. | |
| 6,559,260 B1 | 5/2003 | Fan et al. | |
| 6,835,759 B2 | 12/2004 | Bradford et al. | |
| 2007/0021521 A1 | 1/2007 | Cheng et al. | |
| 2007/0088110 A1* | 4/2007 | Kohl | C08G 18/10 524/261 |
| 2011/0014483 A1 | 1/2011 | Okazaki | |
| 2011/0319559 A1* | 12/2011 | Kania | C08G 75/02 524/609 |
| 2015/0018479 A1* | 1/2015 | Horgan | C09D 133/14 524/555 |

FOREIGN PATENT DOCUMENTS

| | | | |
|---|---|---|---|
| JP | S60108430 A | | 6/1985 |
| JP | 60108430 A | * | 5/1998 |

OTHER PUBLICATIONS

Klosowski, J. and Wolf, A. T. Sealants in Construction, 2ed, CRC Press, Jan. 5, 2016 (Year: 2016).*
"Synthesis and Properties of Acrylate Functionalized Alkyds", N. Thanamongkollit, M. Soucek, University of Akron Polymer Engineering Department, Progress in Organic Coatings, vol. 73, Issue 4, Apr. 2012, pp. 382-391.
"Tung-based Reactive Diluents for Alkyd Systems: Film Properties", K. Wutticharoenwong, J. Dzickowski, M. Soucek, University of Akron Polymer Engineering Department, Progress in Organic Coatings, vol. 73, Issue 4, Apr. 2012, pp. 283-290.
"Synthesis of Tung Oil-based Reactive Diluents", K. Wutticharoenwong, M. Soucek, University of Akron Polymer Engineering Department, Progress in Organic Coatings, vol. 295, 2010, pp. 1097-1106.

* cited by examiner

*Primary Examiner* — Richard A Huhn
(74) *Attorney, Agent, or Firm* — Christopher Lewis

(57) ABSTRACT

Inhibition by oxygen of the peroxide-initiated cure of a composition based on (meth)acrylates or other compounds containing free radical-polymerizable functional groups is mitigated by inclusion of one or more polythiols in the composition. Such compositions may be formulated as multi-part systems, which are useful for the preparation of coatings and sealants.

30 Claims, No Drawings

FREE RADICAL-CURABLE COATING AND SEALANT COMPOSITIONS WITH IMPROVED SURFACE CURE PROPERTIES

CROSS-REFERENCE TO RELATED APPLICATIONS

This application is a U.S. national stage application under 35 USC. § 371 of PCT/EP2017/0551875, filed Mar. 6, 2017, which claims the benefit of U.S. patent application No. 62/308,273, filed Mar. 15, 2016.

FIELD OF THE INVENTION

The present invention relates to free radical-curable coating or sealant compositions, especially in the form of a multi-part system comprising two or three parts to be combined for curing, comprising one or more compounds having two or more free radical-polymerizable functional groups per molecule, one or more polythiol compounds comprising two or more thiol groups per molecule and one or more free radical initiators. Such compositions may be obtained by combining initially separated parts, wherein the free radical initiator(s) is or are in a part separate from the compounds having two or more free radical-polymerizable functional groups per molecule. The compositions are useful as protective coatings and/or sealants for concrete and other substrates.

BACKGROUND OF THE INVENTION

Peroxide-cured (meth)acrylate resin coating compositions find a wide variety of uses in industry and are commonly used as coatings and sealants. The coating compositions are conventionally provided as two-component (two-part) compositions which are mixed just prior to use. In typical formulations, Part A comprises the (meth)acrylate monomers and Part B comprises a peroxide initiator. Metal complex driers, such as cobalt naphthenate or cobalt octoate, are often added to the compositions as cure accelerators in these systems. Cobalt driers undergo oxidative reactions that reduce the decomposition temperature of the peroxide but by themselves are not enough to effectively cure the coating at the surface.

Peroxide-cured coating compositions containing (meth) acrylate functional monomers and oligomers are known to the industry to not cure effectively in air due to oxygen inhibition. This problem becomes particularly acute when coatings based on such compositions are applied to substrate surfaces in very thin layers (where the coating has a large surface area exposed to air, relative to its volume).

Numerous attempts to develop additives to allow for effective curing in air have resulted in materials that were unstable in air, unstable when mixed with metal drier, had poor surface properties or had viscosities impractical for use in a solvent-free coating system. Moreover, certain formulations capable of effective air cure contain components having an unacceptably high level of odor. For example, coating and sealant compositions based on MMA (methyl methacrylate) are used in concrete floor coatings, roofing membranes and concrete sealers. They possess the advantage of fast, tack-free cure at ambient or low temperatures, while also exhibiting good physical properties and chemical resistance when cured. However, these types of formulations are limited in use due to the strong odor and volatility of MMA.

U.S. Pat. No. 5,387,661 relates to the addition of paraffinic and other waxes to peroxide-cured (meth)acrylate-based coatings to provide an oxygen barrier at the surface of the coating to speed the curing. However, having wax at the surface detracts from coating properties such as scratch and mar resistance and gloss and also reduces adhesion to a topcoat. Crosslinking monomers such as dicyclopentenyl and dicyclopentenyloxy alkyl ester derivatives are known to the industry to be good reactive diluents and binder resins that also effectively promote surface cure in peroxide cured (meth)acrylate-based coatings in the presence of metal driers due to their sensitivity for oxidative reactions. However, these monomers are also known in the industry to be volatile and odorous which presents safety and handling concerns.

Other crosslinkable resins such as allyl ether derivatives including polyallyl glycidyl ether (PAGE) derivatives, allyl ester derivatives and allyl urethane derivatives are also known to effectively promote surface cure in peroxide cure (meth)acrylate-based coatings. Lower molecular weight resins are good reactive diluents but higher molecular weight resins like PAGE derivatives and polyallyl urethanes are too high in viscosity for some coating applications such as concrete sealers. These materials are also oxygen sensitive and undergo oxidative reactions in the presence of metal driers to generate hydroperoxides at the surface of the coating. Therefore, these allyl ether and PAGE derivatives present package stability issues if they are packaged with the metal drier in the resin component of a two-component peroxide cure (meth)acrylate-based coating composition. To avoid the stability issues, coating formulators typically have to package the surface cure promoting material as a third component or package the metal drier as a third component which is undesirable. Volatile non-aerobic sensitive materials such as oximes can be added to block metal drier oxidative reactions in the container and extend package stability. Subsequently, when the coating is applied to a substrate the oximes volatilize but they also slow down the rate of cure at the coating surface, which may lead to coating defects and increased tack-free times.

U.S. Pat. Nos. 4,520,184 and 5,567,788 disclose coating compositions containing allylic functional ethers and esters including PAGE derivatives comprising 20 allyl groups per chain, which contain easily abstracted allylic hydrogens that absorb oxygen and generate hydroperoxide radicals at the surface of the coatings. These materials are used as both reactive diluents and surface cure additives in two-component peroxide cure (meth)acrylate-based coatings. The allyl functional ethers and esters cause formulation issues due to their instability in the presence of free-radical cure accelerators such as metal driers in the resin component, which requires the formulator to either develop a complex stabilizer package or to separate the accelerator. When added to the peroxide initiator component of a two-component system, the addition of the functional ethers and esters result in a limited shelf life.

Oxygen inhibition observed in two-component (meth) acrylate-based peroxide free-radical cured coatings containing allyl functional ethers and esters exhibit a difference in cure kinetics between allylic unsaturation and vinyl unsaturation in the base (meth)acrylate coating resins. The slower rate of cure of the allyl unsaturation at the surface of the coating can result in coating defects such as wrinkling, cratering, and orange peel. Additionally, although the allyl functional additives provide tack-free cure, the cured surface does not exhibit good scratch/mar resistance or solvent resistance.

Other methods for overcoming oxygen inhibition have been attempted. For example, U.S. Pat. No. 5,164,127 discloses curing the coating in an inert atmosphere or eliminating oxygen by injecting the coating into a closed mold and curing the in the mold.

U.S. Pat. No. 6,395,822 discloses the use of azonitrile-based free radical initiators in place of peroxide initiators, which are not sensitive to oxygen inhibition. The azonitrile initiators cannot be decomposed at ambient temperatures by accelerators and must be thermally cured.

U.S. Pat. No. 6,835,759 discloses the use of a dual UV photoinitiator/thermal peroxide cure system to eliminate cure rate differences between through cure and surface cure.

Other methods have been disclosed in U.S. Pat. Nos. 4,263,372; 5,387,661; 5,721,326; 6,559,260, "Synthesis and Properties of Acrylate Functionalized Alkyds", N. Thanamongkollit, M. Soucek, University of Akron Polymer Engineering Department, Progress in Organic Coatings, Vol. 73, Issue 4, April 2012, pp. 382-391; "Tung-based Reactive Diluents for Alkyd Systems: Film Properties", K. Wuttich-aroenwong, J. Dzickowski, M. Soucek, University of Akron Polymer Engineering Department, Progress in Organic Coatings, Vol. 73, Issue 4, April 2012, pp. 283-290 and "Synthesis of Tung Oil-based Reactive Diluents", K. Wut-ticharoenwong, M. Soucek, University of Akron Polymer Engineering Department, Progress in Organic Coatings, Vol. 295, 2010, pp. 1097-1106.

SUMMARY OF THE INVENTION

There is a need in the industry for formulations that may avoid the problems caused by oxygen inhibition without some or all of the shortcomings identified above. The development of multipart free radical-cured (meth)acrylate resin coating compositions that can be solvent-free and that are capable of being cured effectively in the presence of oxygen at both ambient and elevated temperatures and exhibit good surface properties, even when the composition is in the form of very thin films, is desirable.

The present invention relates to multi-part formulations based on compounds such as (meth)acrylates containing ethylenically unsaturated functional groups that are curable using free radical initiators such as peroxides, which can be applied as a coating or sealant on a variety of substrates and which can be formulated to be low odor and/or to have a low content of volatiles. The components of such formulations, including in particular one or more polythiol compounds comprising two or more thiol groups per molecule, work together synergistically to provide a fully cured coating or sealant with good surface properties even when applied in thin layers. Additionally, the compositions of the present invention are capable of providing performance similar to that of methyl methacrylate (MMA)-based formulations with respect to fast curing and physical properties at ambient and low temperatures, without MMA or other low molecular weight, odorous and volatile (meth)acrylate monomers.

The inventors have discovered that by including such polythiol compounds in such formulations, the propensity of a coating obtained from the formulation to exhibit delayed or incomplete curing at its surface when exposed to air may be reduced or even avoided altogether. Without wishing to be bound by theory, it is believed that the polythiol compounds react with ethylenically unsaturated functional groups (e.g., (meth)acrylate groups) in components of the formulation at the coating surface and help to reduce radical reactions with the oxygen present in air that delay or terminate the curing or free radical polymerization of such components at the surface of the coating.

Various non-limiting embodiments of the invention may be characterized as follows:

1. A multi-part system either a) or b) as defined below and comprising, consisting essentially of or consisting of, as separately packaged components, either:
   a) a Part A comprising, consisting essentially of or consisting of at least one compound having two or more free radical-polymerizable functional groups and at least one polythiol compound comprising two or more thiol groups and a Part B comprising, consisting essentially of or consisting of at least one free radical initiator; which is a two-parts system or
   b) a Part A comprising, consisting essentially of or consisting of at least one compound having two or more free radical-polymerizable functional groups, a Part B comprising, consisting essentially of or consisting of at least one polythiol comprising two or more thiol groups and a Part C comprising, consisting essentially of or consisting of at least one free radical initiator, which is a three parts system.

2. The multi-part system of embodiment 1, wherein the free radical-polymerizable functional groups are ethylenically unsaturated functional groups.

3. The multi-part system of embodiment 1 or 2, wherein the free radical-polymerizable functional groups are selected from the group consisting of allyl groups, (meth)acrylate groups and combinations thereof.

4. The multi-part system of any one of embodiments 1-3, wherein Part A comprises, consists essentially of or consists of at least one hydroxyl-functionalized (meth)acrylate.

5. The multi-part system of any one of embodiments 1-4, wherein Part A comprises, consists essentially of or consists of at least one hydroxyl-functional epoxy (meth)acrylate.

6. The multi-part system of any one of embodiments 1-5, wherein Part A comprises, consists essentially of or consists of at least one urethane (meth)acrylate.

7. The multi-part system of any one of embodiments 1-6, wherein Part A comprises, consists essentially of or consists of at least one crosslinking monomer which is a dual functional monomer comprising at least three free radical-polymerizable functional groups selected from the group consisting of allyl groups, (meth)acrylate groups and combinations thereof, including at least one allyl group and at least one (meth)acrylate group.

8. The multi-part system of any one of embodiments 1-7, wherein Part A comprises, consists essentially of or consists of at least one epoxy (meth)acrylate and at least one crosslinking monomer which is a dual functional monomer comprising at least three free radical-polymerizable functional groups selected from the group consisting of allyl groups, (meth)acrylate groups and combinations thereof, including at least one allyl group and at least one (meth)acrylate group.

9. The multi-part system of any one of embodiments 1-8, wherein Part A additionally comprises at least one compound having a single free radical polymerizable group.

10. The multi-part system of any one of embodiments 1-9, wherein Part A comprises at least one compound having at least one (meth)acrylate functional group, at least one hydroxyl functional group and at least one epoxy group per molecule.

11. The multi-part system of any one of embodiments 1-10, wherein the at least one polythiol compound includes at least one polythiol compound having a molecular weight of from 350 Daltons to 2000 Daltons.

12. The multi-part system of any one of embodiments 1-11, wherein the at least one polythiol compound includes at least one polythiol compound having a molecular weight of from 400 Daltons to 1000 Daltons.

13. The multi-part system of any one of embodiments 1-12, wherein the at least one polythiol compound includes at least one polythiol compound comprising three or more thiol groups.

14. The multi-part system of any one of embodiments 1-13, wherein the at least one polythiol compound includes at least one polythiol compound comprising three to six thiol groups.

15. The multi-part system of any one of embodiments 1-14, wherein the at least one polythiol compound includes at least one polythiol compound comprising two or more thiol-functionalized carboxylate groups having a structure O—C(=O)—(CH$_2$)$_n$—SH, where n is 1 or 2.

16. The multi-part system of any one of embodiments 1-15, wherein the at least one polythiol compound includes at least one polythiol compound obtained by esterifying a polyalcohol with a thiol-functionalized carboxylic acid.

17. The multi-part system of any one of embodiments 1-16, wherein the at least one polythiol compound includes at least one polythiol compound selected from the group consisting of pentaerythritol tetra(3-mercaptopropionate), trimethylolpropane tri(3-mercaptopropionate), pentaerythritol tetra(2-mercaptoacetate) and trimethylolpropane tri(2-mercaptoacetate).

18. The multi-part system of any one of embodiments 1-17, wherein the at least one polythiol compound includes at least one polythiol compound having a thiol equivalent weight of from 80 Daltons to 450 Daltons.

19. The multi-part system of any one of embodiments 1-18, comprising from 0.01 to 15 parts by weight polythiol per 100 parts by weight total amount of compound(s) of said multi-part system, either a) with respect to Part A+Part B or b) with respect to Part A+Part B+Part C as defined in embodiment 1.

20. The multi-part system of any one of embodiments 1-19, comprising from 0.1 to 5 parts by weight polythiol per 100 parts by weight total amount of compound(s) of said multi-part system, either a) with respect to Part A+Part B or b) with respect to Part A+Part B+Part C, as defined in embodiment 1.

21. The multi-part system of any one of embodiments 1-20, wherein Part A further comprises at least one promoter.

22. The multi-part system of embodiment 21, wherein the at least one promoter comprises at least one transition metal.

23. The multi-part system of any one of embodiments 1-22, wherein the at least one free radical initiator includes at least one peroxide.

24. The multi-part system of any one of embodiments 1-23, wherein Part A additionally comprises at least one stabilizer.

25. The multi-part system of any one of embodiments 1-24, wherein Part A additionally comprises at least one wax.

26. The multi-part system of any one of embodiments 1-25, comprising not more than 5 weight % in total, based on the total weight of said multi-part system, either a) with respect to Part A+Part B or b) with respect to Part A+Part B+Part C, as defined in embodiment 1, of compounds having a boiling point of less than 250° C. at 760 mm Hg.

27. A method of forming a coating on a surface of a substrate, comprising combining either Part A and Part B according to multi-part system a) of any one of the embodiments 1-26 or Part A, Part B and Part C according to multi-part system b) of any one of the embodiments 1-26, to form a coating composition, applying the coating composition to the surface of the substrate and curing the coating composition.

28. The method of embodiment 27, wherein the curing of the coating composition is carried out in the presence of oxygen and the cured coating composition has a thickness as low as 0.003 inches (76μ).

29. A cured coating or sealant obtained by combining either Part A and Part B of multi-part system a) as defined according to any one of embodiments 1 to 26 or by combining Part A, Part B and Part C of multi-part system b), as defined according to any one of embodiments 1-26, to form a coating or sealant composition, applying the coating or sealant composition to a surface of a substrate and curing the coating or sealant composition.

30. A coating or sealant composition comprising at least one compound having two or more free radical-polymerizable functional groups, at least one polythiol compound comprising two or more thiol groups and at least one free radical initiator.

31. Use of a multi-part system (either a) or b)) as defined according to any one of embodiments 1 to 26, in coating or in sealant curable compositions.

32. Use according to embodiment 31, wherein it is in protective coatings or sealants for concrete or concrete repair or for metals or in gels coats for fiber composites.

33. Use according to embodiment 31 or 32, wherein it is in construction, especially in building construction and civil engineering and in industry.

DETAILED DESCRIPTION OF THE INVENTION

Compounds Containing Free Radical-Polymerizable Functional Groups

The coating and sealant compositions of the present invention are characterized by the inclusion of one or more compounds bearing free radical-polymerizable functional groups. In particular, the inventive compositions comprise at least one compound containing two or more free radical-polymerizable functional groups per molecule. Optionally, the compositions may additionally comprise one or more compounds having a single free radical-polymerizable functional group per molecule.

A "free radical-polymerizable functional group" is a functional group capable of participating in a free radical reaction wherein at least one atom of that functional group (e.g., a carbon atom) becomes covalently bonded to an atom (e.g., a carbon atom) in a second molecule. The free radical-polymerizable functional group may be, for example, a functional group containing a carbon-carbon double bond (i.e., a site of ethylenic unsaturation). Compounds containing free radical-polymerizable functional groups suitable for use in the present invention include compounds containing at least one carbon-carbon double bond, in particular a carbon-carbon double bond capable of participating in a free radical reaction wherein at least one carbon of the carbon-carbon double bond becomes covalently bonded to an atom, in particular a carbon atom which is also part of a carbon-carbon double bond, in a second molecule. Such reactions may result in a polymerization or curing whereby the ethylenically unsaturated compound becomes part of a polymerized matrix or polymeric chain. In various embodiments of the invention, the compound may contain one, two, three, four, five or more carbon-carbon double bonds per molecule. Combinations of compounds containing different numbers of carbon-carbon double bonds may be utilized in the coating and sealant compositions of the present invention. The carbon-carbon double bond may be present as part of an α,β-unsaturated carbonyl moiety, e.g., an α,β-unsaturated ester moiety such as an acrylate functional group or a methacrylate functional group. A carbon-carbon double bond may also be present in the ethylenically unsaturated compound in the form of an allyl group. Two or more different types of functional groups containing carbon-carbon double bonds may be present in the compound. For example, the compound may contain two or more functional groups selected from the group consisting of allyl groups, acrylate groups, methacrylate groups and combinations thereof.

(Meth)acrylate compounds suitable for use in the present invention include, but are not limited to, (meth)acrylates of the general formula:

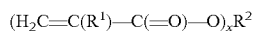

wherein x is an integer of 1 to 6, $R^1$ is hydrogen or methyl and $R^2$ is an alkyl, aryl, alkaryl, aralkyl, cycloaliphatic, polyaryl or polycycloaliphatic group of up to 30 carbon atoms.

In at least one embodiment, the coating or sealant composition includes a dual functional monomer comprising both allyl and (meth)acrylate functional groups. The dual functional monomer according to at least one embodiment comprises at least two allyl functional groups and at least one (meth)acrylate functional group.

As used herein, "allyl group" refers to a $CH_2$—$CH$=$CH_2$ group or a —CHR—CR'=CR"R'", wherein R, R', R" and R'", which may be the same or different, are selected from a hydrogen atom or a substituted or unsubstituted alkyl group having from 1 to 4 carbon atoms. The allyl group comprises at least one allylic hydrogen.

The dual functional monomer may comprise, for example, from 2 to 10 allyl groups, such as from 2 to 6 allyl groups or from 2 to 4 allyl groups. In at least one embodiment, the dual functional monomer comprises 2 allyl groups.

The dual functional monomer may comprise one or more (meth)acrylate groups, such as, for example, from 1 to 5 (meth)acrylate groups or from 1 to 3 (meth)acrylate groups. In at least one embodiment, the dual functional monomer contains a single (meth)acrylate group.

In at least one embodiment, the dual functional monomer comprises 2 allyl functional groups and 1 (meth)acrylate group. One exemplary dual functional monomer is diallyl trimethylolpropane methacrylate, as shown in Formula I (e.g., CAS #20241-99-0).

Formula I

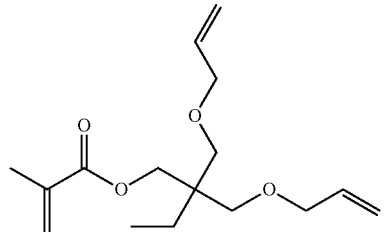

The dual functional monomer may comprise at least two allyl groups and at least one (meth)acrylate group connected via a linking group chosen from branched and unbranched alkyl groups, which may optionally comprise at least one heteroatom substitution. In at least one embodiment, the linking group comprises 2 to 20 carbon atoms, such as, for example, from 2 to 10 carbon atoms or from 3 to 7 carbon atoms.

In certain embodiments, the coating or sealant compositions of the present invention comprise from 1 to 40, from 2 to 35 or from 5 to 30 parts by weight of dual functional monomer per 100 parts by weight in total of compounds having at least one free radical-polymerizable functional group per molecule (including the dual functional monomer(s)).

Also suitable for use in the present invention as compounds having one, two or more free radical-polymerizable functional groups per molecule are (meth)acrylate monomers, i.e., compounds bearing at least one (meth)acrylate group. (Meth)acrylate monomers may include, but are not limited to, polyethyleneglycol di(meth)acrylate, trimethylolpropane tri(meth)acrylate, tricyclodecanediol di(meth)acrylate, methoxy polyethyleneglycol mono(meth)acrylates, ethoxytriglycol (meth)acrylate, isobornyl (meth)acrylate, isodecyl (meth)acrylate, lauryl (meth)acrylate, tridecyl (meth)acrylate, stearyl (meth)acrylate, tetrahydrafurfuryl (meth)acrylate, ethoxylated nonylphenol (meth)acrylate, ethyleneglycol di(meth)acrylate, diethyleneglycol di(meth) acrylate, triethyleneglycol di(meth)acrylate, tetraethyleneglycol di(meth)acrylate, polypropyleneglycol di(meth) acrylate, 1,3-butyleneglycol di(meth)acrylate, neopentylglycol di(meth)acrylate, 1,6-hexanediol di(meth)acrylate, 1,12-dodecanediol di(meth)acrylate and ethoxylated bisphenol A di(meth)acrylates (all available from Sartomer USA, LLC) and combinations thereof.

In at least one embodiment, the composition (means multi-part a) or b) composition) includes at least one (meth)acrylate monomer or oligomer having a (meth)acrylate functionality greater than two. In other embodiments, the coating or sealant composition comprises both at least one monomer or oligomer having a single (meth)acrylate and at least one monomer or oligomer having a (meth)acrylate functionality of at least two. The monomer or oligomer having just one (meth)acrylate functional group per molecule may function as a diluent. In certain embodiments, the mono-(meth)acrylate functionalized compound(s) are relatively high in molecular weight and low in volatility.

The composition may comprise other monomers or oligomers in addition to, or in place of, the at least one (meth)acrylate monomer. For example, the composition may comprise a vinyl ester such as bisphenol A vinyl ester, glycidyl ether acrylate oligomers made from phenyl glycidyl ether, o-cresyl ether, $C_{12}$-$C_{14}$ glycidyl ether, diglycidyl epoxy acrylate oligomers made from bisphenol A diglycidyl ether, bisphenol F diglycidyl ether, 1,4-butanediol diglycidyl ether, trimethyloplpropane triglycidyl ether, epoxy acrylate oligomers made from epoxidized fatty acids, aromatic urethane acrylate oligomers, aliphatic urethane acrylate oligomers, polyester acrylate oligomers, acrylic acrylate oligomers (all available from Sartomer USA, LLC) and combinations thereof. Other oligomers include, for example, allyl urethane oligomers, such as those disclosed in U.S. Pat. No. 6,559, 260, which is incorporated herein by reference in its entirety.

In certain embodiments, the coating or sealant composition comprises at least one urethane (meth)acrylate oligomer, in particular at least one aliphatic polyester-based urethane di(meth)acrylate oligomer. Urethane (meth)acrylate oligomers in the context of this invention are understood to be compounds having two or more (meth)acrylate functional groups which are linked to one another via moieties containing urethane groups. They are obtainable, for example, through the reaction of hydroxyalkyl (meth)acrylates with polyisocyanates and polyols containing at least two hydroxyl functional groups per molecule such as polyether polyols, polyester polyols and the like. Urethane (meth)acrylate oligomers capable of being used in the coating compositions of the present invention include, but are not limited to, oligomers based on aliphatic and/or aromatic polyester polyols and polyether polyols and aliphatic and/or aromatic polyester diisocyanates and polyether diisocyanates capped with (meth)acrylate end-groups.

In various embodiments, the urethane (meth)acrylate oligomers may be prepared by reacting aliphatic and/or aromatic diisocyanates with OH group terminated polyester polyols (including aromatic, aliphatic and mixed aliphatic/aromatic polyester polyols), polyether polyols, polycarbonate polyols, polycaprolactone polyols, polydimethysiloxane polyols or polybutadiene polyols or combinations thereof to form isocyanate-functionalized oligomers which are then reacted with hydroxyl-functionalized (meth)acrylates such as hydroxyethyl acrylate or hydroxyethyl methacrylate to provide terminal (meth)acrylate groups. For example, the urethane (meth)acrylate oligomers may contain two, three, four or more (meth)acrylate functional groups per molecule.

In certain embodiments, the coating or sealant compositions of the present invention comprise from 5 to 75, from 10 to 65 or from 25 to 55 parts by weight of urethane (meth)acrylate oligomer per 100 parts by weight of compounds having at least one free radical-polymerizable functional group per molecule (including the urethane (meth)acrylate(s)).

In certain embodiments, the composition (either multipart system a) or b) composition) comprises at least one (meth)acrylate having at least one (meth)acrylate functional group and at least one hydroxyl (—OH) functional group. Such hydroxyl-functionalized (meth)acrylates include, for example, hydroxyalkyl (meth)acrylates such as hydroxyethyl (meth)acrylate, hydroxypropyl (meth)acrylate and hydroxybutyl (meth)acrylate, (meth)acrylates based on trimethylol propane (TMP) and pentaerythritol (PETA) or other polyols in which at least one hydroxyl group of the polyol (e.g., TMP or PETA) remains non(meth)acrylated, as well as epoxy (meth)acrylates. Epoxy (meth)acrylates, as is well known in the art, are the reaction products obtained wherein the epoxy groups of an epoxy compound, such as a diepoxide, have been ring-opened by reaction with an unsaturated carboxylic acid such as (meth)acrylic acid. Commercially available hydroxyl-functionalized (meth)acrylates suitable for use in the present invention include, but are not limited to, the products sold by Sartomer USA, LLC under the trade names SR495, CN152, CN132, CN133, CN120, CN104 and CN110.

The coating or sealant composition may, in certain embodiments, comprise at least one multi-functional compound having at least one (meth)acrylate functional group per molecule, at least one hydroxyl (—OH) functional group per molecule and at least one epoxy group (e.g., a glycidyl group) per molecule. Commercially available multi-functional (hydroxyl-, epoxy- and (meth)acrylate-functionalized) compounds suitable for use in the present invention include, but are not limited to, the products sold by Sartomer USA, LLC under the trade name CN153.

Polythiols

Any compound having at least two thiol (—SH) functional groups may be advantageously used as a polythiol compound in the compositions of the present invention. For example, the polythiol compound may contain three or more thiol groups, four or more thiol groups or five or more thiol groups. In certain embodiments, no more than ten thiol groups, no more than eight thiol groups or no more than six thiol groups are present in the polythiol compound. Thus, in various embodiments, the polythiol compound contains two to ten or three to eight thiol groups. The polythiol compound may, in certain embodiments, contain three, four, five or six thiol groups.

Further, the polythiol in various embodiments of the invention has a molecular weight of at least 350 Daltons, at least 375 Daltons, at least 400 Daltons, at least 425 Daltons or at least 450 Daltons and/or has a molecular weight not greater than 2000 Daltons, not greater than 1750 Daltons, not greater than 1500 Daltons, not greater than 1250 Daltons or not greater than 1000 Daltons. For example, the polythiol may, in various embodiments, have a molecular weight of from 350 Daltons to 2000 Daltons or 400 Daltons to 1000 Daltons.

Suitable polythiols for use in the present invention may also be characterized with respect to their thiol equivalent weight (calculated by dividing the molecular weight of the polythiol by the number of thiol functional groups per molecule). In various embodiments of the invention, the polythiol compound has a thiol equivalent weight of at least 80 Daltons, at least 90 Daltons, at least 95 Daltons or at least 100 Daltons and/or a thiol equivalent weight of not more than 450 Daltons, not more than 400 Daltons, not more than 350 Daltons, not more than 300 Daltons, not more than 250 Daltons or not more than 200 Daltons. For example, the thiol equivalent weight of the polythiol compound may be from 80 Daltons to 450 Daltons, from 90 Daltons to 400 Daltons or from 100 Daltons to 200 Daltons.

Additionally, it will generally be desirable to select a polythiol compound or combination of polythiol compounds having low odor. For example, the polythiol(s) may be sufficiently low in odor that the coating or sealant composition containing the polythiol(s) does not have any sulfur odor discernable to a human olfactory system when the composition is spread as a layer on a substrate surface at 25° C. In other embodiments, the polythiol compound(s) used has a relatively high flash point, e.g., a flash point of at least 100° C. as measured by ASTM D92-12b.

According to various embodiments of the invention, the polythiol compound may be a monomer, an oligomer or a polymer (i.e., the backbone or skeleton of the polythiol compound may be monomeric, oligomeric or polymeric in character). Each thiol group may be attached to the skeleton or backbone of the polythiol compound either directly or via a linking moiety.

In certain embodiments of the present invention, the polythiol compound is a thiol-functionalized ester of a polyalcohol (a compound containing two or more alcohol functional groups).

The following may be mentioned by way of example as polyalcohols suitable for esterifying with a thiol-functionalized carboxylic acid to provide a polythiol compound: alkanediols, such as butanediol, pentanediol, hexanediol, alkylene glycols, such as ethylene glycol, propylene glycol and polypropylene glycol, glycerin, 2-(hydroxy methyl) propane-1,3-diol, 1,1,1,-tris(hydroxymethyl)ethane, 1,1,1-trimethylolpropane, di(trimethylolpropane), tricyclodecane dimethylol, 2,2,4-trimethyl-1,3-pentanediol, bisphenol A, cyclohexane dimethanol, alkoxylated and/or ethoxylated and/or propoxylated derivatives of neopentyl glycol, tetraethylene glycol cyclohexanedimethanol, hexanediol, 2-(hydroxymethyl)propane-1,3-diol, 1,1,1-tris(hydroxymethyl) ethane, 1,1,1-trimethylolpropane and castor oil, pentaerythritol, sugars, sugar alcohols or mixtures thereof.

In particular, suitable polythiol compounds include esters of α-thioacetic acid (2-mercaptoacetic acid), β-thiopropionic acid (3-mercaptopropionic acid) and 3-thiobutyric acid (3-mercaptobutyric acid), wherein such acids are esterified with diols, triols, tetraols, pentaols or other polyols, such as 2-hydroxy-3-mercaptopropyl derivatives of diols, triols, tetraols, pentaols or other polyols. Mixtures of alcohols may also be used as a basis for the thiol-functionalized compound. In this respect, reference is made to the WO 99/51663 A1 publication, the contents of which are incorporated by reference in this application.

Particularly examples of suitable polythiol compounds which may be mentioned are: glycol-bis(2-mercaptoacetate), glycol-bis(3-mercaptopropionate), 1,2-propylene glycol-bis(2-mercaptoacetate), 1,2-propylene glycol-bis(3-mercaptopropionate), 1,3-propylene glycol-bis(2-mercaptoacetate), 1,3-propylene glycol-bis(3-mercaptopropionate), tris(hydroxymethyl)methane-tris(2-mercaptoacetate), tris(hydroxymethyl)methane-tris(3-mercaptopropionate), 1,1,1-tris(hydroxymethyl)ethane-tris(2-mercaptoacetate), 1,1,1-tris(hydroxymethyl)ethane-tris(3-mercaptopropionate), 1,1,1-trimethylolpropane-tris(2-mercaptoacetate), ethoxylated 1,1,1-trimethylolpropane-tris(2-mercaptoacetate), propoxylated 1,1,1-trimethylolpropane-tris(2-mercaptoacetate), 1,1,1-trimethylol propane-tris(3-mercaptopropionate), ethoxylated 1,1,1-trimethylolpropane-tris(3-mercaptopropionate), propoxylated trimethylolpropane-tris(3-mercaptopropionate), 1,1,1-trimethylolpropane-tris(3-mercaptobutyrate), pentaerythritol-tris(2-mercaptoacetate), pentaerythritol-tetrakis(2-mercaptoacetate), pentaerythritol-tris(3-mercaptopropionate), pentaerythritol-tetrakis(3-mercaptopropionate), pentaerythritol-tris(3-mercaptobutyrate), pentaerythritol-tetrakis(3-mercaptobutyrate), Capcure® 3-800 (BASF), GPM-800 (Gabriel Performance Products), Capcure® LOF (BASF), GPM-800LO (Gabriel Performance Products), KarenzMT PE-1 (Showa Denko), 2-ethylhexylthioglycolate, iso-octylth ioglycolate, di(n-butyl)thiodiglycolate, glycol-di-3-mercaptopropionate, 1,6-hexanedithiol, ethylene glycol-bis(2-mercaptoacetate) and tetra(ethylene glycol)dithiol.

Such polythiol compounds may be prepared by any method known in the art or obtained from commercial sources, such as the polythiols sold under the trade name "Thiocure®" by Bruno Bock.

The polythiol compound may be used alone or as a combination of two or more different polythiol compounds.

In certain embodiments of the invention, an amount of polythiol is included in the coating or sealant composition which is effective to reduce the cure time of the composition as compared to the cure time of a composition that is otherwise identical but that does not contain polythiol. As used herein, "cure time" means the time required to achieve a tack free surface as measured using a Byk-Gardner Dry Time Recorder. In certain embodiments of the invention, the composition is formulated to contain 0.01 to 15 parts by weight or 0.1 to 5 parts by weight polythiol per 100 parts by weight of the total amount of compound(s) of said multi-part system, either a) with respect to Part A+Part B or b) with respect to Part A+Part B+Part C as defined in embodiment 1.

Free Radical Initiators

The invention is directed to multi-part free-radical curable coating compositions. In such composition, the term "free-radical curable" means that the composition is capable of being cured by a free radical mechanism initiated by a free radical initiator such as a peroxide, in particular an organic peroxide. The free radical initiator initiates reactions whereby functional groups containing ethylenic unsaturation (carbon-carbon double bonds) react with other such functional groups present in other molecules, thereby forming covalent bonds between initially separate molecules to form a polymer matrix. In at least one embodiment, the multi-part system is a two-part system and Part B of the multi-part system comprises one or more peroxide initiators. In at least one embodiment, the multi-part system is a three-part system and Part C of the multi-part system comprises one or more peroxide initiators. The term "peroxide" as used herein encompasses all types of compounds, in particular organic compounds, containing one or more oxygen-oxygen (—O—O—) moieties, such as dialkyl, diaryl and aryl/alkyl peroxides, hydroperoxides (including aliphatic hydroperoxides, aromatic hydroperoxides and aralkyl peroxides), peresters, peracids, acyl peroxides, percarbonates and the like. Non-limiting examples of peroxide initiators include cumene hydroperoxide, methylethyl ketone peroxide, tertiary-butyl peroxybenzoate, OO-(t-amyl) O-(2-ethylhexyl) monoperoxycarbonate, OO-(t-butyl) O-(2-ethylhexyl) monoperoxycarbonate, benzoyl peroxide, p-isopropylcumene hydroperoxide and the like and combinations thereof.

In certain embodiments of the invention, the coating or sealant composition contains from 0.1 to 5 or from 0.2 to 4 parts by weight free radical initiator (e.g., organic peroxide) per 100 parts by weight of compounds containing one or more free radical-polymerizable functional groups per molecule.

Promoters

The compositions of the present invention may in certain embodiments contain one or more promoters (also sometimes referred to as accelerators, activators or driers) which help to promote or accelerate the rate at which the compositions cure. The promoter or promoters may be selected such that free radical polymerization (curing) of the components of the composition containing free radical-polymerizable functional groups takes place at ambient temperatures (e.g., 15-35° C.), due to activation of the free radical initiator(s) (e.g., peroxide(s)) by the promoter(s). Suitable promoters include any of the substances known in the art to be suitable for such purpose, including amines, metal salts (which may be referred to as metal driers, including metal complexes, which may be referred to as metal complex driers) and combinations thereof. Suitable amines include, for example, tertiary amines and aromatically substituted amines such as aniline and N,N-dialkyl anilines such as N,N-dimethyl aniline and N,N-diethyl aniline, toluidine and N,N-dialkyltoluidines such as N,N-dimethyl-p-toluidine and N,N-diethyl-p-toluidine, N,N-bis(2-hydroxyethyl)-p-toluidine, N,N-bis(2-hydroxypropyl)-p-toluidine, p-dimethylaminobenzaldehyde and the like and combinations thereof. Suitable metal salts include, but are not limited to, polyvalent metal salts of aliphatic acids such as the acetate, 2-ethylhexanoate, butyrate, pentanoate and hexanoate salts and especially the salts of higher aliphatic acids having from about 8 to about 30 carbon atoms or of naphthenic acids. Suitable metal salts also include those of naphthenic acids or of $C_8$ to $C_{30}$ aliphatic acids. Illustrative metal salts further include salts/complexes of compounds such as lactic acid (lactates) and acetylacetonate. Examples of suitable polyvalent metals include metals such as copper (+2), zinc (+2), manganese (+2), manganese (+3), lead (+2), cobalt (+2), iron (+3), vanadium (+2) and zirconium (+4). Other examples of the acid component or anion of the metal salt promoter are those of resinic acids (rosin acids) such as tall oil fatty acids, linseed oil fatty acids, 2-ethylhexanoic acid, lauric acid, palmitic acid, myristic acid, stearic acid, oleic acid, linoleic acid, behenic acid, cerotic acid, monotanic acid and abietic acid as well as oxides, sulfates, nitrates and halides. Exemplary metal driers are those of cobalt and manganese, e.g., cobalt hexanoate, cobalt octoate, cobalt naphthenate, cobalt acetylacetonate, manganese octoate, manganese naphthenate, manganese acetylacetonate, vanadium naphthenate and vanadium octoate and combinations thereof. Combinations of metal salts, e.g., vanadium and copper salts, vanadium and iron salts, can also be used.

Free Radical Stabilizers

In certain embodiments, the coating or sealant compositions of the invention comprise one or more free radical stabilizers (which may also be referred to as free radical mediators). Free radical stabilizers may be used to regulate and extend the pot life of the composition, as compared to what it would be in the absence of such a substance. Zinc thiocarbamate, 4-hydroxy TEMPO and 1,4-pentanedione (and other dicarbonyl compounds) are examples of suitable stabilizers. Typically, one or more free radical stabilizers may be included in the coating or sealant composition in amounts up to, for example, 2 parts by weight per 100 parts by weight of compounds containing free radical-polymerizable functional groups. In certain embodiments, the coating or sealant composition may comprise from 0.1 to 1.5 parts by weight free radical stabilizer per 100 parts by weight of compounds containing free radical-polymerizable functional groups.

Waxes

One or more waxes, in particular one or more paraffin waxes, may be incorporated into the coating or sealant composition to assist the drying (curing) of a film or coating of the composition on a substrate surface. Without wishing to be bound by theory, it is believed that the wax may migrate to the surface of the film or coating and help to reduce the extent of curing inhibition due to atmospheric oxygen. Suitable paraffin waxes include, for example, petroleum waxes and synthetic waxes, such as polyethylene waxes, oxidized or otherwise modified paraffin waxes or alcohol-type waxes. In certain embodiments, an amount of wax is present in the coating or sealant composition which is 0.005 to 5 or 0.01 to 2 parts by weight per 100 parts by weight of the total amount of compounds having one or more free radical-polymerizable groups present in the coating or sealant composition.

Other Optional Additives

In accordance with at least one embodiment, the coating or sealant composition may comprise a pigment, such as, for example, titanium dioxide. The composition may further or alternatively comprise one or more other additives, including, for example, dispersion aids, fillers (including slip-resistant fillers), chain transfer agents, plasticizers, leveling agents, UV stabilizers, defoamers, rheological additives, flow control agents, wetting agents, impact modifiers and/or adhesion promoters.

Solvents/VOCs/Low Carbon Number (Meth)acrylates

The coating or sealant composition of the present invention may contain one or more non-reactive solvents. However, in various advantageous embodiments, the composition is free or substantially free, of non-reactive solvents (i.e., solvents that do not contain free radical-polymerizable functional groups) or contains less than 5%, less than 4%, less than 3%, less than 2% or less than 1% by weight in total of non-reactive solvent. In further embodiments, in various embodiments, the composition is free or substantially free of Volatile Organic Compounds (VOCs), wherein a Volatile Organic Compound is defined herein as a compound having a boiling point of less than 250° C. at 760 mm Hg. For example, the coating or sealant composition may advantageously be formulated to contain less than 5%, less than 4%, less than 3%, less than 2% or less than 1% by weight or even 0% by weight in total of VOCs.

According to other embodiments of the invention, the coating or sealant composition is free or substantially free of (meth)acrylates containing 6 or fewer carbon atoms per molecule, such as methyl methacrylate (MMA). For example, the composition may contain less than 5%, less than 4%, less than 3%, less than 2% or less than 1% by weight (substantially free of) or even 0% by weight (free of), in total of (meth)acrylates containing 6 or fewer carbon atoms per molecule. In various embodiments, the composition contains less than 5%, less than 4%, less than 3%, less than 2% or less than 1% by weight or even 0% by weight, of MMA.

Formulation and Use of the Multi-Part Systems to Prepare Coating/Sealant Compositions Since curing (polymerization) begins essentially as soon as all of the ingredients of the coating or sealant compositions of the present invention have been combined at room temperature, it is necessary to prepare the compositions shortly before use. Although in principle one could assemble the composition from separate packages of each ingredient, it will be far more convenient to prepare the compositions when needed from two or three packages (parts) each of which is chemically stable by itself. Thus, it will be preferred to provide the compositions in the form of multi-part (i.e., two-part or three-part) systems. In certain embodiments, each part is formulated such that it has sufficient chemical stability at 25° C. over a period of three months that compositions formed therefrom have gel times and tack-free cure times that are substantially the same as those observed for compositions prepared from freshly prepared analogous parts.

The coating or sealant compositions of the present invention thus may be prepared as multi-part systems wherein the free radical initiator (e.g., peroxide) component is kept separate from the compound(s) having free radical-polymerizable functional groups (e.g., ethylenically unsaturated functional groups) until just before the composition is to be prepared and applied to a surface of a substrate. As used herein, "separately packaged" means that a part of the composition is packaged or contained in a way that prevents it from coming into contact with or mixing with another part of the composition, until such time as it is desired to form the coating or sealant composition by combining the multiple parts. The separation of certain components of the composition in this way, as will be described subsequently in more detail, is for the purpose of preventing premature reaction of such components (which otherwise may have a tendency to react with each other at ambient or room temperature, leading to curing and solidification of the composition, which initially is in the form of a relatively low viscosity liquid capable of being readily applied as a thin film or coating to a substrate surface). This allows the components of the composition to be safely stored until the desired time of use, then combined to form the composition for application as a liquid coating to a substrate surface which thereafter cures fairly rapidly to form a solid film. Separately packaged parts of the composition may be in the form of multiple discrete containers or, as will be subsequently described in more detail, in the form of a unitary container having multiple separated chambers (for each of the parts of the multi-part system).

For example, in a three-part system in accordance with embodiments of the invention, a Part A (containing the compound(s) having free radical-polymerizable functional groups, but no free radical initiator) is packaged separately from a Part B (containing polythiol(s)) and separately from a Part C (containing free radical initiator, but no compound(s) having free radical-polymerizable functional groups and optionally no polythiol). In a two-part system in accordance with embodiments of the invention, a Part A (containing the compound(s) having free radical-polymerizable functional groups and polythiol(s), but no free radical initiator) is packaged separately from a Part B (containing free radical initiator, but no compound(s) having free radical-polymerizable functional groups and optionally no polythiol). Consequently, it should be noted that the definition of parts A and B in a two-parts system is not the same as in a three-parts system. In certain embodiments of the invention, Part A (either defined as comprising the compound with at least two free radical-polymerizable groups without the polythiol in a three-part system or in the presence of said polythiol in a two-parts system) also contains one or more promoters, while the initiator-containing part (Part B or Part C) is free of such promoters. The polythiol component of the coating or sealant composition may be present in Part A, in certain embodiments of the invention (a two-part system), while in other embodiments (a three-part system) the polythiol is present in a Part B (separate from compounds having free radical-polymerizable functional groups and separate from the free radical initiator). In certain embodiments, no polythiol is present in the Part containing the free radical initiator(s). The multi-part system of the present invention useful in forming coating or sealant compositions for application to substrate surfaces thus may be, for example, a two-part system (consisting of Part A+Part B) as defined for the two-parts-system a) or a three-part system (consisting of Part A+Part B+Part C, as defined for three-part system b)). Various exemplary embodiments of the multi-part system may be characterized as follows:

Embodiment 1 (Two-Part System)

Part A: comprising one or more polythiols and one or more compounds having two or more free radical-polymerizable functional groups, optionally also comprising one or more compounds having a single free radical polymerizable functional group per molecule, free radical stabilizer(s), and/or promoter(s), but not containing free radical initiator.
Part B: comprising free radical initiator(s), but not polythiol, promoter or compounds having free radical-polymerizable functional groups.

Embodiment 2 (Three-Part System)

Part A: comprising one or more compounds having two or more free radical-polymerizable functional groups, optionally also comprising one or more compounds having a single free radical polymerizable functional group per molecule, free radical stabilizer(s), and/or promoter(s), but not containing polythiol or free radical initiator.
Part B: comprising one or more polythiols, but not containing compounds having free radical-polymerizable functional groups.
Part C: comprising free radical initiator(s), but not polythiol, promoter or compounds having free radical-polymerizable functional groups.
Part A and Part B of the two-part system may be contained separate from one another until the coating or sealant composition is ready to be used. Likewise, Part A, Part B and Part C of the three-part system may be contained separate from one another until the coating or sealant composition is ready to be used. The separate containers used to store each Part may be of any suitable type, such as bottles, cartridges, totes, drums, tanks or other such vessels. This separate storage, however, also includes storage in packaging forms which have two or more chambers joined to one another by at least one partition (for example, a container having a plurality of separated chambers, with a different Part in each chamber).

When preparation of a coating or a sealant on a surface of a substrate is desired, appropriate amounts of each of the aforedescribed Parts (e.g., Part A and Part B in the case of a two-part system or Part A, Part B and Part C in the case of a three-part system) are withdrawn from the separate containers and combined to form the coating or sealant composition. The relative amount of each Part will be determined based on the desired end formulation for the coating or sealant composition. Mixing of the Parts may be accomplished by any appropriate method, such as stirring, static mixers or dynamic mixers. Metered addition or metered mixing may be employed to form the coating or sealant compositions of the present invention. In the case of the three-part system embodiment, each of the Parts can be mixed simultaneously with each other or with time offsets.

The various components of the coating or sealant composition may desirably be selected so as to provide a composition having an initial viscosity (as measured immediately after mixing the Parts) that is relatively low and that facilitates application of the composition to a substrate surface to form a coating or film. The composition, when mixed, may for example have a viscosity at 25° C. less than about 35 mPa·s (cP) as measured using a Brookfield DV-III RVT Viscometer, such as, for example, a viscosity of less than about 30 mPa·s (cP), less than about 25 mPa·s (cP) or less than about 20 mPa·s (cP). Viscosity is measured according to ASTM D1243. The low viscosities of the inventive compositions enable such compositions to readily penetrate pores, small cracks and fissures that may be present on the substrate surface (e.g., a concrete floor or other concrete surface) to which the compositions are applied so that the cured coating or film that subsequently forms from the composition can more effectively seal the substrate (thereby preventing or reducing penetration of the substrate by liquids and the like).

In at least one embodiment, the coating or sealant composition, once the Parts of the multi-part system have been combined, has a gel time less than about 1 hour at 25° C. as measured based on a 25 g sample using a Sunshine Gel Meter, such as, for example, less than about 45 minutes, less than about 30 minutes, less than about 25 minutes, less than about 20 minutes or less than about 15 minutes. In at least one embodiment, the composition has a gel time ranging from about 10 to 30 minutes, such as, from about 15 to 25 minutes. Gel time is measured according to ASTM D7029-09.

In at least one embodiment, the coating or sealant composition cures tack-free in air in less than about 24 hours when measured using a gloved fingertip, preferably less than 18 hours, more preferably less than about 10 hours, even more preferably less than 5 hours and even more preferably less than 3 hours.

In at least one embodiment, a method of forming a coating or sealant comprises mixing Part A and Part B of the two-part system or mixing Part A, Part B and Part C of the three-part system to form a coating or sealant composition and curing the coating or sealant composition. Curing may take place at ambient temperatures (e.g., 15° C. to 35° C.) or at elevated temperatures and in the presence of oxygen (e.g., in air).

The compositions according to the present disclosure may be used in coatings or sealants or as coatings or sealants, for example, as sealers for concrete, for concrete repair, and metals. The term "coating" as used herein includes paints, varnishes, inks and/or gel coats. For example, compositions according to the present disclosure may also be used as gel coats for fibrous composites.

The substrates to which the compositions of the present invention are applied may be diverse in their nature. They may be natural or artificial substrates. More particularly, they may be mineral substrates such as concrete, stone, masonry, rock and the like or metals and metal alloys, such as, for example, aluminum, steel, brass, copper or metal sheet, plastics such as polyvinyl chloride (PVC), acrylonitrile-butadiene-styrene copolymers (ABS), SMC (sheet molding compound), polycarbonate (PC), polyamide (PA), polyester (PE), polyoxymethylene (POM), polyolefins, especially polyethylene (PE) or polypropylene (PP) or polymeric materials such as paints. The coated or sealed articles produced by a method in accordance with the present invention have broad application in construction, especially building construction and civil engineering and in industry.

The compositions of the present invention are notable for a marked reduction or in particularly preferred cases even the complete elimination of oxygen inhibition. The consequences of this are that the compositions are rapidly tack-free and dust-dry without the need for costly and inconvenient after-treatment by means of heat or removal of a sticky layer. This is particularly important in those applications where large areas of the composition to be cured are in contact with the air. The very rapid curing that is achievable using the inventive compositions makes them highly suitable for use in applications, such as floor coatings, where it will be desirable to traverse, utilize, further treat or handle the coated or sealed substrate as soon as possible.

The inventive compositions are characterized in that oxygen inhibition of the curing of the coating or sealant formed from the compositions is significantly reduced, as compared to analogous compositions which do not contain any polythiol. The cure time exhibited by such coatings or sealants can thus be advantageously short, even when the coating or film is relatively thin (e.g., 7μ or 0.003 inches or 3 mils). Moreover, the resulting cured coating or sealant is capable of having an attractive surface appearance (e.g., smooth rather than mottled, with moderate rather than low gloss). At the same time, however, the pot life remains acceptably long, thus permitting a batch of the composition to be prepared and then applied to a substrate surface at a later point in time, rather than immediately after combining the Parts. This combination of attributes has previously proven to be difficult to achieve, as generally changes in formulation which are effective to shorten cure time (by addressing the problem of oxygen inhibition) adversely affect the surface properties of the cured coating or sealant.

The embodiments and examples disclosed herein are not intended to limit the scope of the invention in any way.

EXAMPLES

The following examples demonstrate the utility and advantages of two-component peroxide cure coating compositions in accordance with the present invention. Three-part systems may be formulated in a similar way, but in such three-part systems the polythiol is kept separate from the (meth)acrylate oligomers/monomers and from the peroxide. Viscosities were measured using a Brookfield DV-III RVT Viscometer. Gel Times were measured on 25 g samples using a Sunshine Gel Meter. Specified amounts of a formulation were poured into aluminum weighing pans to measure Shore D Hardness using ASTM D2240 as the test method. Coating test panels were prepared using a wire-wound drawdown bar designed to apply the specified coating thickness. Tack-free Cure Time for these samples was measured using a Byk-Gardner Dry Time Recorder. Physical properties were tested using the ASTM D638 Tensile Test Method.

Comparative Examples 1-3

The two part coating compositions of Comparative Examples 1-3 were each based on the combination of (meth)acrylate oligomers/monomers listed in Table 1 (the amounts listed are in parts by weight). The (meth)acrylate oligomers/monomers are identified by trade name and are commercially available from Sartomer USA, LLC (Exton, Pa.):

CN1963—an aliphatic polyester-based urethane dimethacrylate oligomer

CN132—a low viscosity aliphatic diacrylate oligomer

SR350—a trimethacrylate monomer (trimethylolpropane trimethacrylate)

SR217—a low viscosity aliphatic monoacrylate monomer

SR523—an allyl functional methacrylate monomer

The Cur-Rx® metal accelerator is a vanadium octoate-based drier available from Borchers.

Part A of the coating composition was prepared by warming the oligomers to 60° C. and then mixing them into the monomers using a mechanical mixer equipped with a cowls blade at low shear until homogeneous. The cure accelerators described in Table 1 were then mixed into the oligomer/monomer mixture at low shear to make up Part A. The peroxide initiators were added as Part C at the levels listed in Table 1 and were stirred into Part A by hand until homogeneous.

The resulting coating compositions were applied by drawdown bars onto aluminum test panels at 15-20 mil thickness and then placed in a 55° C. oven. All three coating compositions exhibited acceptable application viscosity and gel time. The coating composition initiated with benzoyl peroxide (Comparative Example 1) required 48 hours to cure tack-free. The coating compositions initiated with cumene hydroperoxide (Comparative Examples 2 and 3) cured tack-free in less than 24 hours (3 hours in the case of the composition containing PRO13379 activator). However, the attainment of even shorter tack-free curing times would be highly desirable, provided that application viscosity and gel time remain acceptable.

TABLE 1

Comparative Examples 1-3 Formulation and Coating Properties

| | Comparative Example 1 | Comparative Example 2 | Comparative Example 3 |
|---|---|---|---|
| Part A | | | |
| CN1963 | 40 | 40 | 45 |
| CN132 | 20 | 20 | 20 |
| SR350 | 20 | 20 | 10 |
| SR217 | 20 | 20 | 15 |
| SR523 | 20 | 20 | 10 |
| Dimethyl-p-Toluidine | 0.10 | — | — |
| 6% Cobalt Octoate | 0.50 | — | — |

TABLE 1-continued

Comparative Examples 1-3 Formulation and Coating Properties

| | Comparative Example 1 | Comparative Example 2 | Comparative Example 3 |
|---|---|---|---|
| Accelerator Cur-Rx ® Metal | — | 0.20 | — |
| Accelerator Dimethyl Aniline | — | 0.10 | — |
| Vanadium/Copper-based Activator | — | — | 4.0 |
| Part B | | | |
| Benzoyl Peroxide (40% active) | 1.0 | — | — |
| Luperox ® CU80 Cumene Hydroperoxide | — | 2.0 | 2.0 |
| Properties | | | |
| Part A Coating Resin Viscosity @25° C. (cP) | 680 | 680 | 680 |
| Gel Time @ 25° C., 25 g sample (min) | 24 | 5 | 3 |
| Cure Time @ 55° C., 0.015" coating thickness (hr) | >24 | >6, <22 | 3.0 |
| Appearance | Slight Brown | Clear | Clear |

Comparative Example 4, Inventive Examples 5 and 6

The two-part coating compositions of Comparative Examples 4 and 5 and Inventive Example 6 were each based on the combination of (meth)acrylate oligomers/monomers listed in Table 2 (the amounts listed are in parts by weight). The (meth)acrylate oligomers/monomers are identified by trade name and are commercially available from Sartomer USA, LLC (Exton, Pa.):

CN1963—an aliphatic polyester-based urethane dimethacrylate oligomer
CN132—a low viscosity aliphatic diacrylate oligomer
SR350—a trimethacrylate monomer (trimethylolpropane trimethacrylate)
SR420—monofunctional acrylate monomer
SR644—a polypropylene glycol (400) dimethacrylate
SR523—an allyl functional methacrylate monomer
Thiocure® PETMP is pentaerythritol-tris(3-mercaptopropionate), available from Bruno Bock.

A thiocarbamate free radical stabilizer was added to all three compositions to extend the gel time. Additionally, a 10% paraffin wax solution (Byk® S781) was added to all three compositions to improve the ambient cure time at a less than 0.015" coating thickness. Part A of each composition was prepared by warming the oligomers to 60° C. and then mixing them into the monomers using a mechanical mixer equipped with a cowls blade at low shear until homogeneous. The activator (promoter) mixtures (except for the vanadium/copper-based activator) were then mixed into the oligomer-monomer mixture at low shear. The thiocarbamate stabilizer, vanadium/copper-based activator and the paraffin wax solution were then mixed into the oligomer-monomer mixture at low shear until homogeneous in the order they are listed in Table 2 to make up Part A. A polythiol (Thiocure® PETMP) was also included in the formulations of Inventive Examples 5 and 6 and found to improve the surface cure characteristics.

The combination of the vanadium/copper-based activator and paraffin wax significantly improved the cure time at ambient temperature, but resulted in a mottled surface having reduced gloss. The addition of the polythiol in Inventive Examples 5 and 6 significantly enhanced cure time and resulted in coatings having a smooth surface with improved gloss. The addition of the thiocarbamate was also found to result in extended gel times.

TABLE 2

Comparative Example 4 and Inventive Examples 5 and 6 Formulation and Coating Properties

| | Comparative Example 4 | Inventive Example 5 | Inventive Example 6 |
|---|---|---|---|
| Part A | | | |
| CN1963 | 45 | 45 | 45 |
| CN132 | 20 | 20 | 20 |
| SR350 | 10 | 10 | 10 |
| SR420 | 15 | 15 | 15 |
| SR644 | 10 | 10 | — |
| SR523 | — | — | 10 |
| Thiocarbamate Stabilizer | 0.8 | 0.8 | 0.6 |
| Vanadium/Copper-based Accelerator | 12.0 | 12.0 | 12.0 |
| Byk ® S781 Paraffin Wax | 1.0 | 1.0 | 1.0 |
| Thiocure ® PETMP Polythiol | — | 2.0 | 0.2 |
| Part B | | | |
| Luperox ® CU80 Cumene Hydroperoxide | 2.0 | 2.0 | 2.0 |
| Properties | | | |
| Gel Time @ 25° C., 25 g sample (min) | 18 | 6 | 23 |
| Cure Time @ 23° C., 0.003" coating thickness (hr) | 2.0 | 0.5 | 2.0 |
| Appearance | Mottled, Low Gloss | Mottled, Low Gloss | Smooth, Moderate Gloss |

The invention claimed is:

1. A multi-part system either a) or b) comprising, as separately packaged components, either:
   a) a Part A comprising at least one compound having two or more free radical-polymerizable functional groups and at least one polythiol compound comprising two or more thiol groups and a Part B comprising at least one free radical initiator; or
   b) a Part A comprising at least one compound having two or more free radical-polymerizable functional groups, a Part B comprising at least one polythiol comprising two or more thiol groups and a Part C comprising at least one free radical initiator,
   wherein the free radical-polymerizable functional groups are selected from the group consisting of allyl groups, (meth)acrylate groups and combinations thereof.

2. The multi-part system of claim 1, wherein the free radical-polymerizable functional groups are ethylenically unsaturated functional groups.

3. The multi-part system of claim 1, wherein Part A comprises at least one hydroxyl-functionalized (meth)acrylate.

4. The multi-part system of claim 1, wherein Part A comprises at least one hydroxyl-functional epoxy (meth)acrylate.

5. The multi-part system of claim 1, wherein Part A comprises at least one urethane (meth)acrylate.

6. The multi-part system of claim 1, wherein the at least one compound having two or more free radical-polymerizable functional groups comprises at least one crosslinking monomer which is a dual functional monomer comprising at least three free radical-polymerizable functional groups selected from the group consisting of allyl groups, (meth) acrylate groups and combinations thereof, including at least one allyl group and at least one (meth)acrylate group.

7. The multi-part system of claim 1, wherein Part A comprises at least one epoxy (meth)acrylate and at least one crosslinking monomer which is a dual functional monomer comprising at least three free radical-polymerizable functional groups selected from the group consisting of allyl groups, (meth)acrylate groups and combinations thereof, including at least one allyl group and at least one (meth) acrylate group.

8. The multi-part system of claim 1, wherein Part A additionally comprises at least one compound having a single free radical polymerizable group.

9. The multi-part system of claim 1, wherein Part A comprises at least one compound having at least one (meth) acrylate functional group, at least one hydroxyl functional group and at least one epoxy group per molecule.

10. The multi-part system of claim 1, wherein the at least one polythiol compound includes at least one polythiol compound having a molecular weight of from 350 Daltons to 2000 Daltons.

11. The multi-part system of claim 1, wherein the at least one polythiol compound includes at least one polythiol compound having a molecular weight of from 400 Daltons to 1000 Daltons.

12. The multi-part system of claim 1, wherein the at least one polythiol compound includes at least one polythiol compound comprising three or more thiol groups.

13. The multi-part system of claim 1, wherein the at least one polythiol compound includes at least one polythiol compound comprising three to six thiol groups.

14. The multi-part system of claim 1, wherein the at least one polythiol compound includes at least one polythiol compound comprising two or more thiol-functionalized carboxylate groups having a structure O—C(=O)—(CH$_2$)$_n$—SH, where n is 1 or 2.

15. The multi-part system of claim 1, wherein the at least one polythiol compound includes at least one polythiol compound obtained by esterifying a polyalcohol with a thiol-functionalized carboxylic acid.

16. The multi-part system of claim 1, wherein the at least one polythiol compound includes at least one polythiol compound selected from the group consisting of pentaerythritol tetra(3-mercaptopropionate), trimethylolpropane tri(3-mercaptopropionate), pentaerythritol tetra(2-mercaptoacetate) and trimethylolpropane tri(2-mercaptoacetate).

17. The multi-part system of claim 1, wherein the at least one polythiol compound includes at least one polythiol compound having a thiol equivalent weight of from 80 Daltons to 450 Daltons.

18. The multi-part system of claim 1, comprising from 0.01 to 15 percent by weight of polythiol compound based on the total weight of said multi-part system, either a) with respect to Part A+Part B or b) with respect to Part A+Part B+Part C.

19. The multi-part system of claim 1, comprising from 0.1 to 5 percent by weight of polythiol compound based on the total weight of said multi-part system, either a) with respect to Part A+Part B or b) with respect to Part A+Part B+Part C.

20. The multi-part system of claim 1, wherein Part A further comprises at least one promoter.

21. The multi-part system of claim 20, wherein the at least one promoter comprises one or more transition metals.

22. The multi-part system of claim 1, wherein the at least one free radical initiator includes at least one peroxide.

23. The multi-part system of claim 1, wherein Part A additionally comprises at least one free radical stabilizer.

24. The multi-part system of claim 1, wherein Part A additionally comprises at least one wax.

25. The multi-part system of claim 1, comprising not more than 5 weight % in total, based on the total weight of said multi-part system, either a) with respect to Part A+Part B or b) with respect to Part A+Part B+Part C of compounds having a boiling point of less than 250° C. at 760 mm Hg.

26. A method of forming a coating or sealant on a surface of a substrate, comprising combining either Part A and Part B according to multi-part system a) as defined in claim 1 or combining Part A, Part B and Part C according to multi-part system b) as defined in claim 1, to form a coating or sealant composition, applying the coating or sealant composition to the surface of the substrate and curing the coating or sealant composition.

27. The method of claim 26, wherein the curing of the coating or sealant composition is carried out in the presence of oxygen and the cured coating or sealant composition has a thickness as low as 0.003 inches (76µ).

28. A method of forming a coating or sealant on a substrate comprising combining Part A and Part B of a) of claim 1 or combining Part A, Part B, and Part C of b) of claim 1 to form a mixture and applying the mixture to the substrate.

29. The method according to claim 28, wherein the coating or sealant is used for concrete or concrete repair or for metals or in gels coats for fiber composites.

30. The method according to claim 28, wherein the coating or sealant is used in construction.

\* \* \* \* \*